March 13, 1945. H. S. NUTTING ET AL 2,371,350
DISTILLATION OF AMMONIA AND HYDROCARBON MIXTURES
Filed April 17, 1940
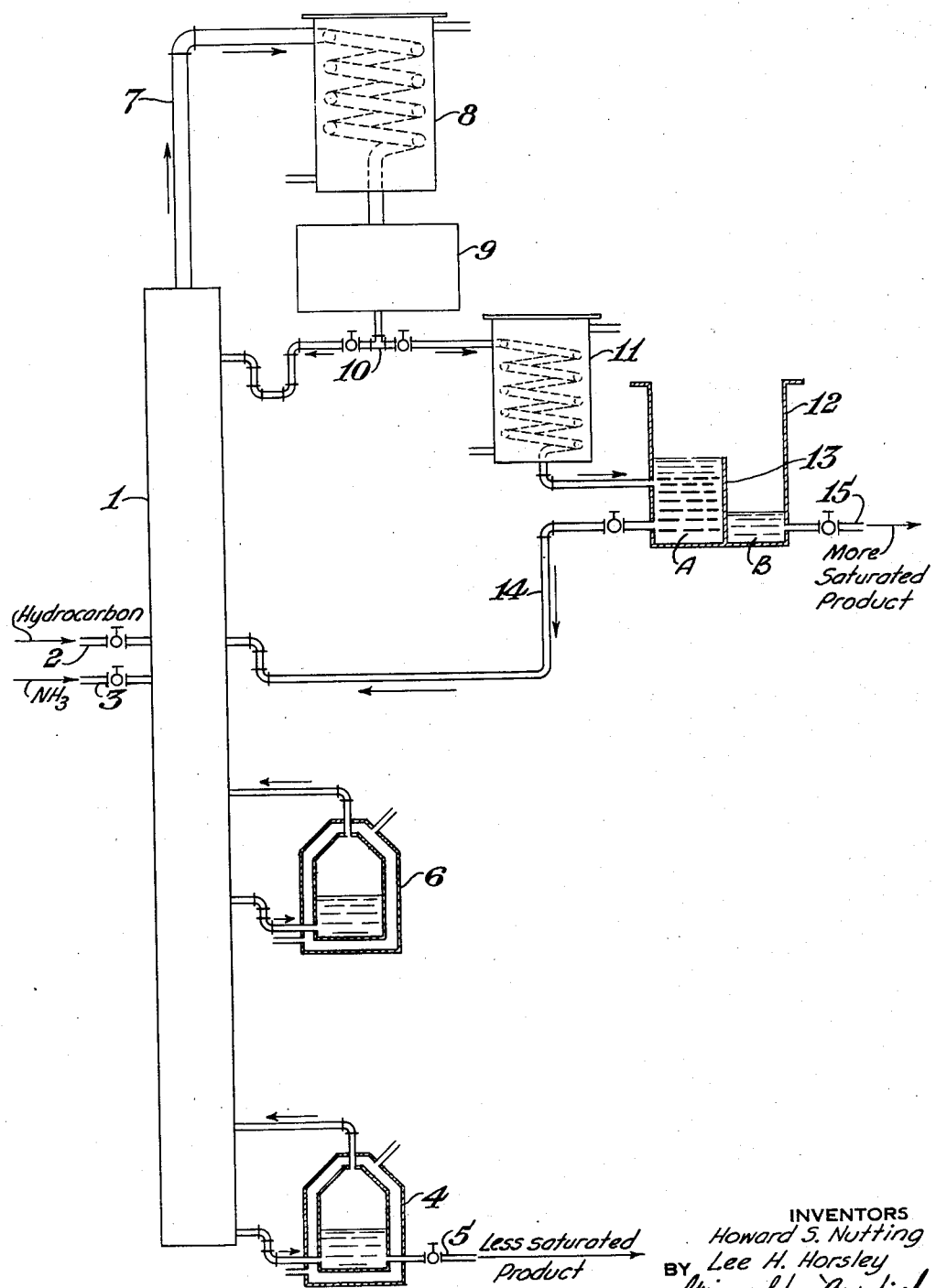
INVENTORS
Howard S. Nutting
Lee H. Horsley
BY
Griswold + Burdick
ATTORNEYS Patented Mar. 13, 1945

2,371,350

UNITED STATES PATENT OFFICE 2,371,350

DISTILLATION OF AMMONIA AND HYDROCARBON MIXTURES

Howard S. Nutting and Lee H. Horsley, Midland, Mich., assignors to The Dow Chemical Company, Midland, Mich., a corporation of Michigan Application April 17, 1940, Serial No. 330,205

4 Claims. (Cl. 202—42)

This invention concerns an improved method of distilling mixtures comprising ammonia and aliphatic hydrocarbons containing from 4 to 6 carbon atoms in the molecule.

In our co-pending application, Serial No. 287,218, filed July 29, 1939, of which this application is a continuation-in-part, we have disclosed a method for separating unsaturated aliphatic hydrocarbons from complex hydrocarbon mixtures which comprises subjecting the mixtures to repeated fractional distillation, certain of the distillations being carried out in the presence of substantially anhydrous ammonia and others being carried out in the absence of ammonia. The distillation in the absence of ammonia may, as is known, be applied to separate from a complex hydrocarbon mixture such as cracked-oil gas, which usually contains hydrocarbons having from 1 to 6 carbon atoms in the molecule and comprises paraffins, olefines, diolefines and acetylenes, individual fractions which consist for the most part of hydrocarbons having the same number of carbon atoms in the molecule, e. g., a mixture of butane, butylene, butadiene, ethyl-acetylene, and vinyl-acetylene. The distillation with ammonia may be applied in separating individual unsaturated hydrocarbons from such fraction. The ammonia forms with various of the hydrocarbons present a series of azeotropes which have somewhat different distilling temperatures and markedly different heats of vaporization, thus permitting fractionation to separate the unsaturated hydrocarbons from one another. For instance, a mixture of butane, butylene, butadiene and ethyl-acetylene may be distilled together with ammonia to obtain a first fraction consisting largely of ammonia, butane and butylene; a second fraction of ammonia and butadiene; and a third fraction of ethyl-acetylene alone or together with ammonia. The solutions of ammonia and an unsaturated hydrocarbon obtained as fractions of the distillate may be cooled to cause separation of ammonia from the hydrocarbon and the ammonia may be returned to the distillation. The distillation may be carried out at any desired pressure, e. g., at atmospheric pressure or above, but the distilling temperatures and the heats of vaporization of the azeotropes diverge, and fractionation occurs more efficiently as the pressure is increased. The distillation is preferably carried out at pressures between 150 and 400 pounds per square inch, gauge, and it may be carried out at considerably higher pressures, e. g., at pressures up to the critical pressure.

Although the method of said co-pending application, Serial No. 287,218, is entirely operable, certain difficulties have been encountered in carrying out the distillations of hydrocarbons together with ammonia in accordance with usual fractional distillation procedure. As hereinbefore indicated, when a mixture of hydrocarbons of varying degrees of saturation, but having the same number of carbon atoms in the molecule, is fractionally distilled in the presence of ammonia, the more nearly saturated hydrocarbons first distill together with ammonia, leaving the more unsaturated hydrocarbons in the residue. For instance, when a mixture of butylene and butadiene is distilled, the butylene and ammonia first distill together leaving the butadiene in the residue. Thus, the hydrocarbons which are most unsaturated and most susceptible to polymerization tend to accumulate in the lower portion of the distilling column and are heated within the still at higher temperatures and for longer periods of time than are the corresponding more saturated and more stable hydrocarbons. During fractional distillation of a mixture of ammonia, an olefine and a corresponding diolefine by the usual procedure of introducing the heat by means of a heater, e. g., a boiler, located at the bottom of the distilling column, an appreciable portion of the diolefine frequently undergoes polymerization and the polymer formed tends to coat the inner surface of the heater and thus reduces the heat transfer.

Also, in the co-pending application, Serial No. 287,218, it is recommended that each fraction of distillate containing ammonia and a hydrocarbon be cooled sufficiently to cause separation of ammonia from the hydrocarbon product and that the ammonia be returned to the distillation. It has since been found that return of the ammonia as reflux material to the distillation upsets the equilibrium between liquids and vapors in the upper portion of the distilling column and reduces the efficiency of the distillation.

An object of this invention is to provide an improved method of distilling mixtures of ammonia and aliphatic hydrocarbons having 4 to 6 carbon atoms in the molecule, whereby the foregoing difficulties may be avoided and the productive capacity of the still may be increased. Other objects will be apparent from the following description of the invention.

We have discovered that although the azeotropes of ammonia with aliphatic hydrocarbons containing from 4 to 6 carbon atoms in the molecule distill at lower temperatures than do the hydrocarbons alone, said azeotropes have considerably higher heats of vaporization than do the hydrocarbons. More specifically we have found that at a common distilling temperature of 35° C., such aliphatic hydrocarbons have latent heats of vaporization which vary from about 140 to about 180 B. t. u. per pound, whereas at the same distilling temperature the azeotropes of ammonia and the hydrocarbons have latent heats of vaporization which range from about 300 to about 400 B. t. u. per pound. Accordingly, the heat required to vaporize 1 pound of the azeotrope of ammonia and a given aliphatic hydrocarbon containing from 4 to 6 carbon atoms at a given temperature is considerably greater than the heat required to vaporize 1 pound of any such hydrocarbon alone at the same temperature. In general, the heats of vaporization of the hydrocarbons decrease with increase in the distilling temperature. Since at constant pressure the azeotropes have lower boiling points than the hydrocarbons, the difference between the heats of vaporization of the hydrocarbons and those of the azeotropes at a given distilling pressure is even greater than indicated by the foregoing latent heats of the hydrocarbons and their azeotropes with ammonia at a fixed boiling temperature.

We have further found that although the return of ammonia alone as reflux material to the fractional distillation of the hydrocarbons with ammonia reduces the efficiency of the fractionation, a portion of the solution of ammonia and a hydrocarbon being distilled may be returned as reflux material to increase the efficiency of the fractionation. The anhydrous ammonia which is separated from the remainder of the distillate may advantageously be returned to the distillation as feed liquor at a point between the extremities of the distilling column.

On the basis of our foregoing discoveries, we have invented the following improved method of distilling mixtures of ammonia and aliphatic hydrocarbons having 4 or more carbon atoms in the molecule.

The annexed drawing is a diagrammatic side view of distilling apparatus suitable for use in practicing the invention. In the drawing, numeral 1 designates a distilling column which may be provided with distilling plates or other packing not shown. Column 1 is provided near its center with inlets 2 and 3 for hydrocarbons and ammonia, or, optionally, with a single inlet for a mixture of such substances. Near its bottom, column 1 is provided with a heater 4, which may be a jacketed boiler having an inlet and outlet for a heating fluid as indicated, or may be any of the other usual types of heaters. An outlet 5 from heater 4 permits withdrawal of the higher boiling product from the still. Another heater 6 is connected with column 1 at a point above heater 4 but below inlets 2 and 3. Column 1 is provided at its top with a vapor line 7 which leads to a condenser 8. The latter is connected with and drains into a reservoir 9 which is provided at its bottom with a branched conduit 10. One branch of the conduit 10 is in the form of a valved U tube. It connects with distilling column 1 near its top and permits return of condensate to the column for reflux purposes. The other branch of conduit 10 leads to a cooler 11 which in turn connects with and drains into a separator 12. The latter is divided by a baffle 13 into chambers A and B so that liquids entering chamber A from condenser 11 may separate into layers and the upper layer may over-flow the baffle and enter chamber B. A valved line 14 connects the lower portion of chamber A with the mid-section of column 1 and permits return of the bottom layer of liquor in chamber A as feed-liquor to the distilling column. Chamber B of the separator 12 is provided with an outlet 15. It will be understood that the apparatus just described is illustrative and that other forms of apparatus may be employed. For instance, in place of a single still provided with two heaters, as shown, there may be used two stills each provided with a heater and arranged in series one above the other so that liquid passes from the upper still into the lower one and vapors issuing from the lower still are fed into the lower portion of the upper still.

In using the apparatus illustrated in the drawing to separate an unsaturated aliphatic hydrocarbon containing from 4 to 6 carbon atoms per molecule from a hydrocarbon mixture comprising the same and a more saturated hydrocarbon containing the same number of carbon atoms, the hydrocarbon mixture is fed into distilling column 1 through inlet 2 and the boilers 4 and 6 are heated sufficiently to cause reflux. Ammonia is introduced through inlet 3 at a rate sufficient to form an azetropic mixture thereof with the more saturated hydrocarbon, but not with the entire quantity of the more unsaturated hydrocarbon. Since the azeotropic mixture of ammonia and the more saturated hydrocarbon is lower boiling than the more unsaturated hydrocarbon, the latter accumulates in the lower portion of the distilling column and in the boiler 4, whereas a mixture of ammonia and the more saturated hydrocarbon accumulates in the center and toward the top of the column. Heater 6 is positioned so that the material passing through the same contains ammonia and the more saturated, and hence more stable, hydrocarbon.

A substantial proportion, e. g., at least one-fourth and preferably more than one-half, of the heat required for the distillation is introduced by means of heater 6. The heat introduced by way of heater 4 is preferably only sufficient to cause the more unsaturated hydrocarbon to reflux in the lower portion of the distilling column and thus to maintain the liquor in heater 4 substantially free of ammonia. A portion of the purified more unsaturated hydrocarbon may be withdrawn periodically or continuously from boiler 4 through outlet 5.

The mixture of ammonia and the more saturated hydrocarbon which distills passes from the top of column 1 to condenser 8 where it is cooled sufficiently to condense the same. The condensate, which usually is at a temperature between 5° C. and its boiling point, but may in some instances be even colder, passes from the condenser 8 into the reservoir 9. From the latter a portion of it is returned through one branch of conduit 10 as reflux material to the upper portion of distilling column 1 and a portion passes through the other branch of conduit 10 to cooler 11 where it is cooled sufficiently to cause mechanical separation of ammonia from the hydrocarbon. The temperature required to cause such mechanical separation is dependent upon the hydrocarbon present. When the solution contains ammonia and a saturated hydrocarbon having from 4 to 6 carbon atoms in its molecule such separation occurs upon cooling it to temperatures below 30° C. or thereabout. When the hydrocarbon ingredient is an olefine, it may be necessary to cool the solution to 10° C. or lower in order to effect the separation. When it is a diolefine, cooling of the solution to temperatures between 0° and −35° C. will cause the separation. When it is an acetylene considerably lower temperatures are required.

The cooled mixture passes from the cooler 11 to a separator 12, where separate layers of ammonia and the hydrocarbon are formed. When the hydrocarbon in the mixture is one having 4 carbon atoms in its molecule, it forms the upper layer of the mixture. When it contains 5 carbon atoms it usually is of nearly the same density as the ammonia and the addition of a trace of water or other liquid, e. g., ethylene glycol, kerosene, etc., which dissolves in one component of the mixture to change its density, may be required in order to obtain layer formation. When the hydrocarbon in the mixture contains 6 carbon atoms in the molecule, it separates as the lower layer. In any instance the ammonia layer is returned, e. g., through line 14, as feed to the center of distilling column 1 and the hydrocarbon layer its withdrawn through outlet 15.

The distillation may be, and preferably is, carried out in continuous manner. During continuous operation the major portion of the ammonia employed is recycled in the distilling system and only sufficient ammonia need be fed into the system to compensate for such losses as may occur. However, the hydrocarbon mixture may be fed in steady flow to the distilling system and the hydrocarbons separated from the mixture may be withdrawn continuously from the system.

The method as just described possesses a number of advantages. It provides for continuous separation of ammonia from the distillate and for recycling of the ammonia in the distilling system without disturbing the equilibrium between liquids and vapors in the upper portion of the distilling column which is essential to efficient fractionation. More important, it permits the greater part of the heat required for the distillation to be introduced directly to the mixture of ammonia and the relatively stable more saturated hydrocarbon which refluxes within the column above the lower section thereof and thereby reduces the amount of heat fed to the more unsaturated and less stable hydrocarbon in the lower section of the column and the boiler attached thereto. In other words it reduces the time during which the unsaturated and less stable hydrocarbon need be retained within the relatively hot lower portion of the still below that required when all of the heat is introduced by means of a heater at the bottom of the distilling column and it thereby reduces or avoids polymerization of said hydrocarbon. The method has other advantages. It permits a considerable portion of the heat to be fed into the system by way of the heater 6 at a lower temperature than is required when it is introduced at the bottom of the distilling column, e. g., by means of heater 4. Since the cost of heat generally becomes higher with increase in the temperature to be attained, it thereby reduces the cost of heating. This feature of introducing a considerable part of the heat directly to the mixture of ammonia and hydrocarbons by means of a heater situated some distance up the column, instead of supplying all of the heat to the hydrocarbon material at the bottom of the column, reduces markedly the weight and volume of liquids which must be evaporated per hour within the still in order to obtain a given rate of distillation. It thereby increases the productive capacity of the still per unit volume of the latter; in other words, it permits the distillation to be carried out at given rate in a still of smaller volume than is required when all of the heat is supplied at the bottom of the distilling column.

The following examples illustrate certain of the advantages of the invention, but are not to be construed as limiting its scope.

EXAMPLE 1

The purpose of this example is to present comparative data on a series of distillations at the same rate of a similar mixture of equal parts by weight of butylene and butadiene in the presence of sufficient ammonia to azeotrope with the butylene by: (1) introducing all of the heat by means of a primary heater situated at the bottom of the distilling column, and (2) introducing only part of the heat at the bottom of the column and the remainder of the heat directly to the mixture of the hydrocarbons and ammonia in the upper portion of the column by means of a secondary heater connected with the column some distance above the primary heater. The only difference in conditions under which the distillations are carried out is in the mode and temperature at which heat is introduced to the distillation system. The following conditions are common to all of the distillations: distilling pressure, 175 lbs./sq. in.; distilling temperature (i. e., temperature at the head of the distilling column) 35° C.; temperature at the base of the distilling column, 80° C.; quantity of material distilled per hour, 2800 pounds; composition of distillate, approximately 65% by weight ammonia and 35% butylene; heat of vaporization of the distillate at the distilling temperature, 350 B. t. u./lb.; and heat of vaporization of butadiene at 80° C. (i. e., the temperature at which it is heated at the base of the distilling column), 150 B. t. u./lb. The table gives for each of the comparative distillations the kind and the quantity of material vaporized per hour in the primary heater and also in the secondary heater, the temperature at which each vaporization is carried out, and the British thermal units of heat per hour required for each vaporization. It may be mentioned that the primary heater at the bottom of the distilling column corresponds to heater 4 in the accompanying drawing and that the secondary heater corresponds to heater 6 of the drawing.

*Table I*

| Distillation No. | Material vaporized per hour in— | | | | | | | | | | Total lbs. of material vaporized per hr. | Total gals. of material vaporized per hr. |
|---|---|---|---|---|---|---|---|---|---|---|---|---|
| | Primary heater | | | | | Secondary heater | | | | | | |
| | Kind | Lbs. | Gals. | Temp., °C. | Heat required B. t. u. | Kind | Lbs. | Gals. | Temp., °C. | Heat required B. t. u. | | |
| 1 | Butadiene | 6,700 | 1,340 | 80 | 1,000,000 | None | | | | | 6,700 | 1,340 |
| 2 | do | 3,350 | 670 | 80 | 500,000 | NH₃ and hydrocarbons | 1,400 | 280 | 35 | 500,000 | 4,750 | 950 |
| 3 | do | 1,660 | 332 | 80 | 250,000 | do | 2,100 | 420 | 35 | 750,000 | 3,760 | 752 |

EXAMPLE 2

The purpose of this example is to present data on a series of distillations at the same rate of similar mixtures of equal parts by weight of amylene and pentadiene in the presence of sufficient ammonia to azeotrope with the amylene, but not with the pentadiene, by: (1) introducing all of the heat required by means of a heater at the bottom of the distilling column, and (2) introducing part of the heat by means of a primary heater at the bottom of the distilling column and part by means of a secondary heater a sufficient distance above the bottom of the column so that the material heated therewith consists of a mixture of ammonia and the hydrocarbons. The only conditions which are varied in the distillation are the mode of heating and the temperature at which heat is introduced to the system. The following conditions are common to all of the distillations: distilling pressure, 175 lbs./sq. in.; distilling temperature, 35° C.; temperature at the base of the distilling column, 120° C.; quantity of material distilled per hour, 2540 pounds; composition of distillate, approximately 80% ammonia and 20% amylene; heat of vaporization of the distillate at the distilling temperature, 400 B. t. u./lb.; and heat of vaporization of pentadiene at 120° C., i. e., the temperature to which it is heated at the base of the distilling column, 140 B. t. u./lb. The table gives, for each distillation, the kind and the quantity of material which is vaporized per hour in the primary heater and also in the secondary heater and the British thermal units of heat required per hour for each vaporization.

plained, change being made as regards the method herein disclosed, provided the step or steps stated by any of the following claims or the equivalent of such stated step or steps be employed.

We therefore particularly point out and distinctly claim as our invention:

1. In a method wherein a mixture, comprising aliphatic hydrocarbons which boil at close to the same temperature and include at least one unsaturated hydrocarbon and which hydrocarbons contain from 4 to 6 carbon atoms in the molecule, is fractionally distilled in the presence of only sufficient substantially anhydrous ammonia to azeotrope with a portion of the hydrocarbons present to distill off the azeotrope and leave an unsaturated hydrocarbon in the residue, the steps of introducing a minor part of the heat required for the distillation to the hydrocarbon in the lower portion of the distilling system and the major part of the heat directly to the mixture of ammonia and hydrocarbon thereabove, returning a portion of the distillate as reflux at a point near the top of the distilling column, separating ammonia from the remainder of the distillate and returning the ammonia to the distilling column at a point between the extremities thereof.

2. In a method wherein an unsaturated aliphatic hydrocarbon having from 4 to 6 carbon

*Table II*

| Distillation No. | Material vaporized per hour in— | | | | | | | | | | Total lbs. of material vaporized per hr. | Total gals. of material vaporized per hr. |
|---|---|---|---|---|---|---|---|---|---|---|---|---|
| | Primary heater | | | | | Secondary heater | | | | | | |
| | Kind | Lbs. | Gals. | Temp., °C. | Heat required B. t. u. | Kind | Lbs. | Gals. | Temp., °C. | Heat required B. t. u. | | |
| 1 | Pentadiene. | 7,100 | 1,183 | 120 | 1,000,000 | None | | | | | 7,100 | 1,183 |
| 2 | ...do... | 3,550 | 592 | 120 | 500,000 | NH₃ and hydrocarbons. | 1,270 | 212 | 35 | 500,000 | 4,820 | 804 |
| 3 | ...do... | 1,775 | 296 | 120 | 250,000 | ...do... | 1,905 | 318 | 35 | 750,000 | 3,680 | 614 |

The invention may advantageously be applied in distilling other mixtures of ammonia and aliphatic hydrocarbons containing from 4 to 6 carbon atoms in the molecule. For instance, it may be applied: in distilling an azeotropic mixture of ammonia and butadiene from a mixture of ammonia, butadiene and ethyl acetylene to leave the latter in purified condition; in distilling an azeotrope of ammonia and pentadiene from a mixture thereof with a pentyne; in distilling an azeotropic mixture of ammonia and hexane and/or hexylene from a mixture thereof with a hexadiene to purify the latter; or in distilling any such hydrocarbon having only a small proportion, e. g., 2–10% by weight, of ammonia dissolved therewith to distill off the ammonia as an azeotropic mixture thereof with a portion of the hydrocarbon to leave the bulk of the latter in a form free of ammonia. In all such distillations it is advantageous, as hereinbefore explained, to introduce a considerable portion of the heat required directly to the mixture of ammonia and the hydrocarbon being distilled by means of a secondary heater located part way up the distilling column and to introduce to the hydrocarbon at the base of the column only sufficient heat to cause it to reflux mildly and thus to maintain it substantially free of ammonia.

Other modes of applying the principle of the invention may be employed instead of those explained, change being made as regards the method herein disclosed, provided the step or steps stated by any of the following claims or the equivalent of such stated step or steps be employed.

atoms in the molecule is separated from a mixture thereof with a more saturated aliphatic hydrocarbon containing the same number of carbon atoms in the molecule by fractionally distilling the mixture in the presence of sufficient substantially anhydrous ammonia to form a relatively low boiling azeotrope with the more saturated hydrocarbon, the steps of supplying only a minor part of the heat required for the distillation to the unsaturated hydrocarbon in the lower end of the distilling system and supplying a major part of the heat at a lower temperature directly to the mixture of ammonia and hydrocarbons thereabove in the column.

3. In a method wherein a mixture of a butylene and butadiene is fractionally distilled in the presence of sufficient substantially anhydrous ammonia to form an azeotrope with the butylene so as to distill off a mixture of ammonia and butylene leaving the butadiene as residue, the steps of supplying only a minor part of the heat required for the distillation to the butadiene in the lower end of the distilling system and supplying a major part of the heat at a somewhat lower temperature directly to the mixture of ammonia and butylene hydrocarbons thereabove.

4. In a method wherein a mixture of butylene and butadiene is fractionally distilled in the presence of sufficient substantially anhydrous ammonia to form an azeotrope with the butylene, the steps of supplying less than one-half of the heat required for the distillation to the butadiene in the lower end of the distilling column, supplying the major portion of the heat required for the distillation directly to the ammonia and hydrocarbon mixture at a point above the lower end of the distilling column, returning a portion of the distillate to the distilling column at a point near its head for reflux purpose, separating substantially anhydrous ammonia from the remainder of the distillate, and returning the ammonia to the distillation at the mid-section of the distilling column.

HOWARD S. NUTTING.
LEE H. HORSLEY.